United States Patent [19]

Plenzler

[11] 4,410,844

[45] Oct. 18, 1983

[54] SLIDING DOOR ACTUATING MECHANISM

[75] Inventor: James D. Plenzler, Toledo, Ohio

[73] Assignee: Allied Corporation, Morristown, N.J.

[21] Appl. No.: 382,256

[22] Filed: May 26, 1982

[51] Int. Cl.³ ................................................ H02P 7/10

[52] U.S. Cl. .................................... 318/280; 318/351; 318/466; 318/286; 318/523

[58] Field of Search ................................ 318/265-267, 318/280-286, 306, 308, 340, 430, 408, 446, 452, 466, 467, 468, 469, 495, 496, 523, 525-527, 351, 354, 424

[56] References Cited

U.S. PATENT DOCUMENTS

| | | | |
|---|---|---|---|
| 3,383,577 | 5/1968 | Ellmore | 318/267 |
| 4,090,113 | 5/1978 | Ogishi | 318/468 |
| 4,217,529 | 8/1980 | Bourke et al. | 318/424 |
| 4,352,051 | 9/1982 | Johnson | 318/525 |
| 4,370,603 | 1/1983 | Franz, Jr. et al. | 318/523 |

*Primary Examiner*—J. V. Truhe
*Assistant Examiner*—A. Evans
*Attorney, Agent, or Firm*—James P. DeClercq

[57] ABSTRACT

An actuating mechanism for sliding doors is intended to be installed in a van. A winch (44) is mounted inside of the van. A guide assembly (50) is installed in an aperture in the door frame. A cable (52) is connected to an arm added to the latch operating mechanism, and to the winch (44) for opening the door. A second cable (60) is attached to the rear edge of the door, and to the winch (44) for closing the door. A switch (102) connects an additional winding on an electric motor (138) to provide a high force for latching the door, allowing the use of a low and noninjurious force for closing the door. A control circuit is provided which allows a keyless closing switch to be used, subsequent operation of the switch having no effect on the motor.

3 Claims, 17 Drawing Figures

SLIDING DOOR ACTUATING MECHANISM

This application is related to application Ser. Nos. 099,111, filed Nov. 29, 1979, and 270,713, filed June 5, 1981, as a divisional of Ser. No. 099,111.

BACKGROUND OF THE INVENTION

The present invention relates to a sliding door actuating mechanism, and in particular to a control circuit for an actuating mechanism for sliding doors provided on the passenger side of conventional motor vehicles.

Certain panel-type trucks, which are generally referred to as vans, are equipped with a sliding door on the passenger side of the vehicle. Such a door is supported at three points, two support points having fixed arms which ride in tracks provided in the vehicle body. These tracks curve inwardly towards the front of the vehicle. The third support point involves a spring-loaded pivotally-mounted arm riding in a track on the vehicle body disposed on the exterior of the vehicle, either at the top or center of the vehicle side. When the door is being moved from its open to its closed position, the inwardly-curving tracks bring the front edge of the door into engagement with the vehicle body, and the pivotally-mounted arm allows the rear end of the door to be swung inwardly to latch the door in a position flush with the vehicle side. When the door is being opened, the rear edge of the door is moved outwardly while the front edge of the door is still engaged with the door frame in the vehicle body. Then, as the door is moved rearwardly, the door slides to the rear at an angle until the front edge of the door is disengaged from the door frame, and then becomes parallel to the side of the vehicle.

In such a door, it is necessary to apply a force to the rear edge of the door to urge it into engagement with the door frame, since seals around the edges of the door frame must be compressed to prevent entry of water and the like into the vehicle interior when the door is closed. To provide this force, the conventional latch mechanism includes a linkage so that motion of the door handle causes a hook-shaped pawl on the vehicle door to rotate and engage a striker pin on the door frame. Continued rotation of the pawl draws the rear edge of the door into engagement with the vehicle side. Alternatively, the necessary force for seal compression may be imparted to the door manually, by slamming the door.

It is desirable that such a sliding door be power-operated so that it can be opened and closed from a remote point, and without physical effort on the part of the operator. It is also desirable that such a door can be power-operated from the exterior of the vehicle to close it without the use of a key, without the possibility of damage to the control circuit or power operator if a closing control switch is maintained in operated condition by vandalism or the like. It should be noted that such doors, due to the door seals, may require considerable physical effort merely to bring the rear edge of the door into proximity with the door frame, so that rotation of the striker can pull the door to its closed position. A simple, inexpensive power-actuating mechanism for such a sliding door is desirable for use in vans used as taxis and shuttles between airport terminals and parking lots, particularly in inclement weather, and such an actuating mechanism is also desirable for use with vans used for recreational and other purposes. In particular, such an actuating mechanism is desirable in conjunction with modifications to a van to enable its use by a handicapped individual confined to a wheelchair.

Actuating mechanisms to operate a sliding door on a vehicle have been proposed. Typical of such mechanisms is U.S. Pat. No. 3,652,124, issued to Tronville, Mar. 28, 1972, disclosing an actuating mechanism for a sliding door on a small taxi. Tronville discloses a hand lever mounted adjacent to the driver's seat of the taxi, operating a plurality of flexible cables or rods, which in turn operate a mechanism for unlatching the door, and for pulling an edge of the door inwards for latching. Tronville also discloses the use of an electrical motor for moving the door between its opened and closed positions, either mounted in the vehicle body and operating a chain drive disposed on the exterior of the vehicle, or mounted in the vehicle door and provided with a pinion for engaging a rack mounted on the exterior of the vehicle.

Applicant's invention provides an actuating mechanism and a control circuit for the actuating mechanism that is simple and rugged in design, and is economical to manufacture, install, and maintain. Applicant's invention provides a sliding door actuator and control circuit which may be installed on a van at the time it is manufactured, or at any later time, without substantial modification of the conventional vehicle, and without disabling the existing manual operating mechanism, overcoming numerous deficiencies and complexities of known sliding door actuating mechanisms.

SUMMARY OF THE INVENTION

Applicant's invention provides an actuating mechanism and control circuit for a conventional sliding door on a conventional van, which can be conveniently added to the existing manual mechanism at the time of manufacture of such a vehicle, or can be conveniently installed at a later time.

The preferred embodiment utilizes a single winch assembly, with a novel two-section winch drum which maintains tension in two flexible cables used to operate the door, as well as compensating for the different paths of movement of the front and rear edges of the door by resiliently adjusting for differential movement of the cables. A guide assembly is mounted at the rear edge of the doorjamb, including a pulley for guiding the cable used to open the door, and a pivoting guide mechanism for guiding the cable which closes the door around the edge of the door frame to the rear edge of the door. The guide mechanism need not pivot to accomplish the objectives and advantages of the invention. A pulley is attached to the lower rear corner of the door frame, and guides the opening cable towards the front lower corner of the door, where it enters a guide tube extending into the door, and is terminated at a lever attached to the conventional operating mechanism. An electrical switch disposed at any convenient point is used to open and close the door. When the electrical switch is operated to open the door, the cable which is terminated at the lever attached to the conventional operating mechanism is wound onto a winch, first unlatching then opening the door. An electrical switch, which may be integral with the winch assembly, turns the winch motor off when the door reaches a predetermined position near the full open position.

When the internal or external electrical switch is actuated to close the door, the cable which is guided around the edge of the door frame, and attached to the rear edge of the door, is wound onto a winch drum, pulling the door towards its closed position. When the door nears its closed position, the force provided by the closing cable acts substantially perpendicular to the door to pull the rear edge of the door inward and latch the door.

In the preferred embodiment, the means for guiding the closing cable around the edge of the door frame is pivotally mounted, and includes a switch which is actuated when the door is in position to be pulled inwardly and latched. The switch may also be located at any convenient point such as around the periphery of the door frame. Actuation of this switch energizes an additional field winding on an electrical motor to provide additional force to latch the door. By means of this switch, high forces are provided only when the door is substantially closed, eliminating the need for costly and complicated safety devices to prevent personal injuries when the door is moved from its open to closed position.

It is a primary object of the invention to provide a system for opening and closing a sliding door in a door frame, wherein the door moves in a first direction forward and backward to slide the door open and closed, and in a second direction to latch the door in a closed position, comprising means for exerting a force on the door to open the door in a first forward direction and means for exerting a force on the door to close the door in a first backward direction, where the force applied to close the door moves the door to a substantially closed position in the first direction, and moves the door in a second direction to latch the door within the door frame.

It is a further principal object of the invention to provide a system and control circuit for opening and closing a sliding door in a van which can be installed in a conventional van without substantial modification of the van.

It is a further object of the invention to provide a system for opening and closing a sliding door on a van which is safe to use, which will prevent the door from accidentally closing on a person when the van is parked on a grade by holding any open position, which incorporates momentary operating switches to require conscious operator involvement for continued door motion, which may be operated from the exterior of the van without a key to close the door and cannot be damaged by prolonged operation of the keyless switch, which provides a noninjurious low-operating force during normal door travel, which allows manual operation of the door if electrical power fails, and which provides audible indication of its operation.

It is a further object of the invention to provide a system for opening and closing a sliding door in a van where an apparatus for winding a linear material, such as flexible cable, and for maintaining tension on the cable is provided, which apparatus includes a driver means, means for winding connected to the driver means for rotating the winding means in first and second directions to take up and let out the cable, and means connected between the driver means and the winding means for forcing the winding means in the first direction beyond the position of the driver means.

It is a further object of the invention to provide a system for opening and closing a sliding door on a van which does not affect the aesthetic appearance of either the inside or the outside of the van.

It is a further object of the invention to provide a system for opening and closing a sliding door on a van which is simple and inexpensive to manufacture, and is simple and convenient to install, maintain, and repair.

DESCRIPTION OF THE PREFERRED EMBODIMENT

Figure 1:
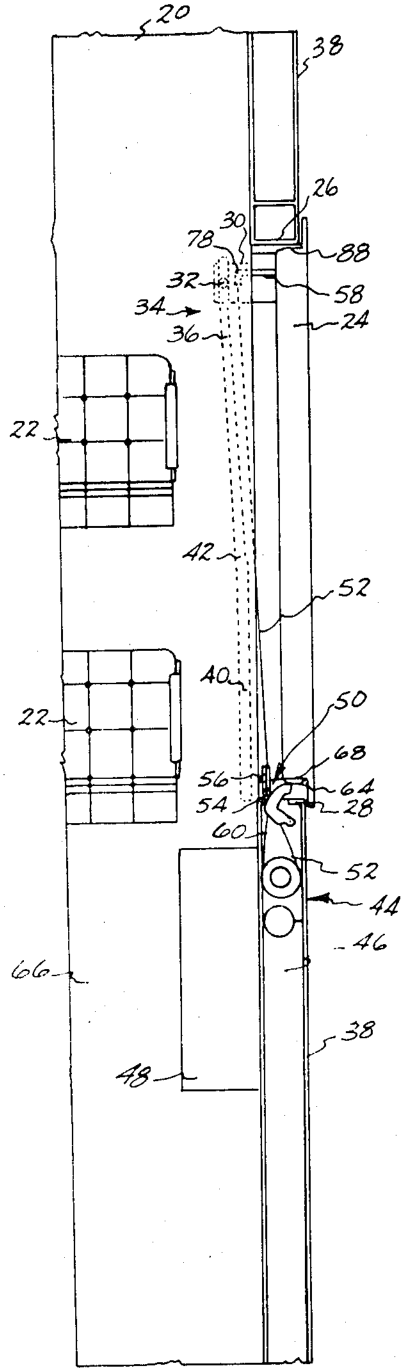
FIG. 1 is a fragmentary top-elevational view of a conventional van including an actuating mechanism in accordance with the invention, showing the door in closed and latched position.

Referring to the drawings, FIGS. 1, 2, 3 and 4 illustrate the path of motion of a sliding door on the passenger side of a conventional van equipped with an actuator according to the invention. A van 20, which may be equipped with a plurality of seats 22 is provided with a door 24. In closed position, as shown in FIG. 1, door 24 fits between front doorjamb 26 and rear doorjamb 28. The door 24 is provided with bracket 30. Bracket 30 carries roller 32, which rides in track 34 and guides the door. As shown in FIGS. 1-4, track 34 has several sections. Towards the front of vehicle 1, track 34 has a short section 36 which is parallel to side 38 of the van 20. Towards the rear of the vehicle, track section 40 is also parallel to side 38 of van 20, but closer to side 38 than section 36. A track section 42 connects sections 36 and 40.

A winding means shown as a winch assembly 44 is mounted inside rear quarter panel section 46 of van 20, adjacent wheel housing 48. A guide means shown as guide assembly 50 is mounted on rear doorjamb 28. A means for exerting a force on the door, shown as cable 52, is attached to winch assembly 44, and runs over pulley 54 of guide assembly 50, over a pulley 56 attached at the rear lower corner of the door frame, and forward to the lower front corner of door 24, where it enters guide tube 58, which extends into door 24 and which is attached to bracket 30 by a clamp or the like. Guide tube 58 may be bent at its lower end as shown, or a pulley may be provided at that point. Cable 52 acts to unlatch and open door 24. A second cable 60 passes from winch assembly 44, over pivoting guide member 62 of guide assembly 50, to a cable termination 64 attached to the rear edge of door 24. Cable 60 acts to close and latch the door.

Guide track 34 is disposed beneath the inner floor 66 of van 20. A similar track, not shown, is located on the inner surface of the roof of van 20 to guide the upper front corner of door 24. In a conventional van, the rear edge 68 of door 24 is provided with a pivoted arm, not shown, pivotally attached to the door, and pivotally attached to a carrier block which slides in a track attached to the exterior of the vehicle, to support the door in a third place, and to allow rear edge 68 of door 24 to move in a direction perpendicular to side 38 of van 20, as well as parallel to side 38 of van 20. For clarity, the details of this conventional mounting arrangement have been omitted from the drawings.

Figure 2:
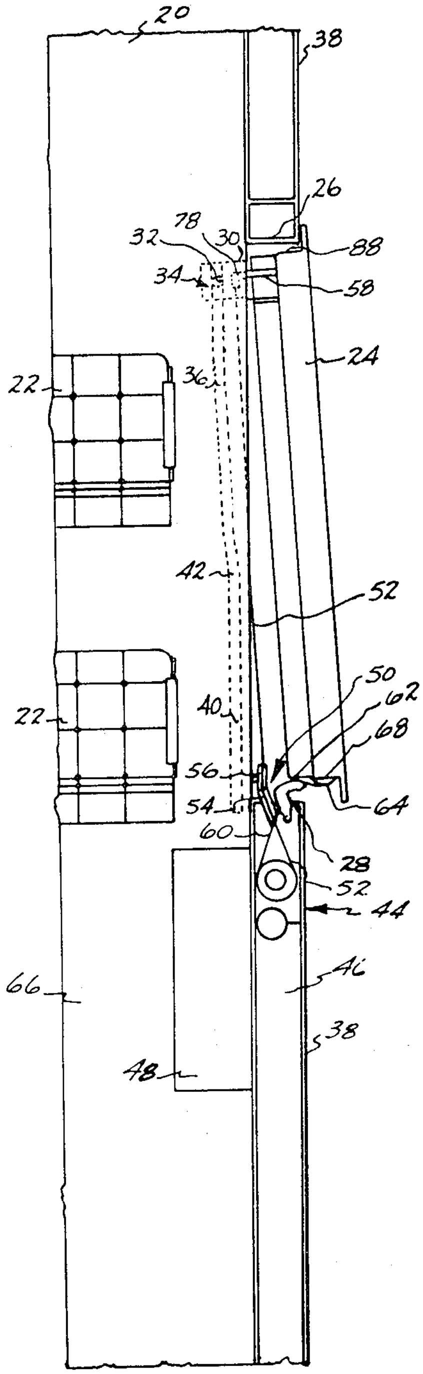
FIG. 2 is a fragmentary top-elevational view of a conventional van including an actuating mechanism in accordance with the invention, showing the door in unlatched position.

As shown in FIG. 2, rear edge 68 has moved outward from the rear door jam 28 of van 20, and door 24 has begun to move towards the rear of van 20. Pivoted guide 62 has moved outward to guide cable 60 around the edge of the door frame. This compound motion causes differential extension of cables 52 and 60.

Figure 3:
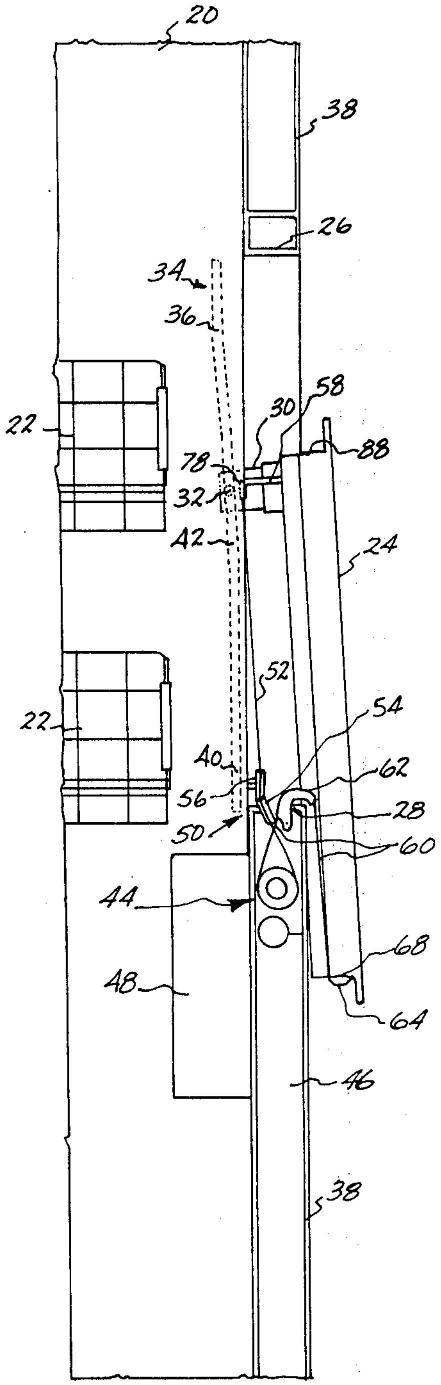
FIG. 3 is the fragmentary top-elevational view of a conventional van including an actuating mechanism in accordance with the invention, showing the door in an intermediate position.
Figure 4:
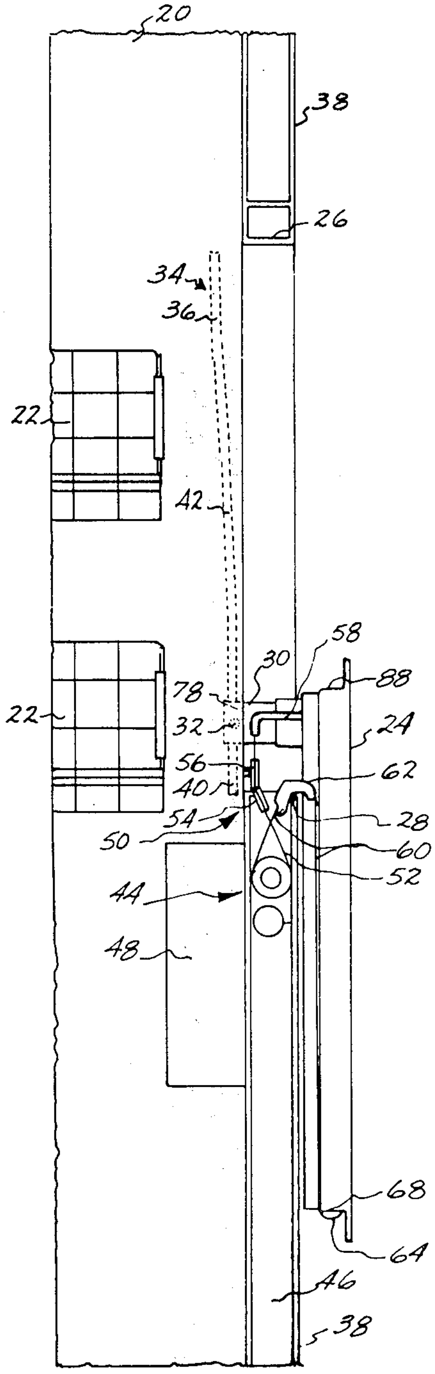
FIG. 4 is a top-elevational view of a conventional van including an actuating mechanism in accordance with the invention, showing the door in open position.

FIG. 3 shows door 24 in an intermediate position, and FIG. 4 shows door 24 in a fully opened position.

As is apparent from FIGS. 1–4, when cable 52 is retracted by winch assembly 44, the van door 24 is opened. When cable 60 is retracted by winch assembly 44, the door is closed. Closing door 24 requires motion in a sequence opposite to that shown in FIGS. 1–4. The door 24 first moves forward parallel to the side 38 of van 20, in a first direction, through the positions shown in FIGS. 3 and 2, until cable termination 64 contacts pivoted guide 62. At this time, cable 60 is pulling door 24 in a second direction, perpendicular to the side 38 of van 20, to pull rear edge 68 of door 24 into latched position. As will be later described, actuation of pivoting guide 62 by cable termination 64 increases the force provided by winch assembly 44, to insure positive latching of door 24, while allowing a lower force to be used when the door is being moved in the first direction between its opened and closed directions, to reduce the changes of personal injury from operation of door 24.

Figure 5:
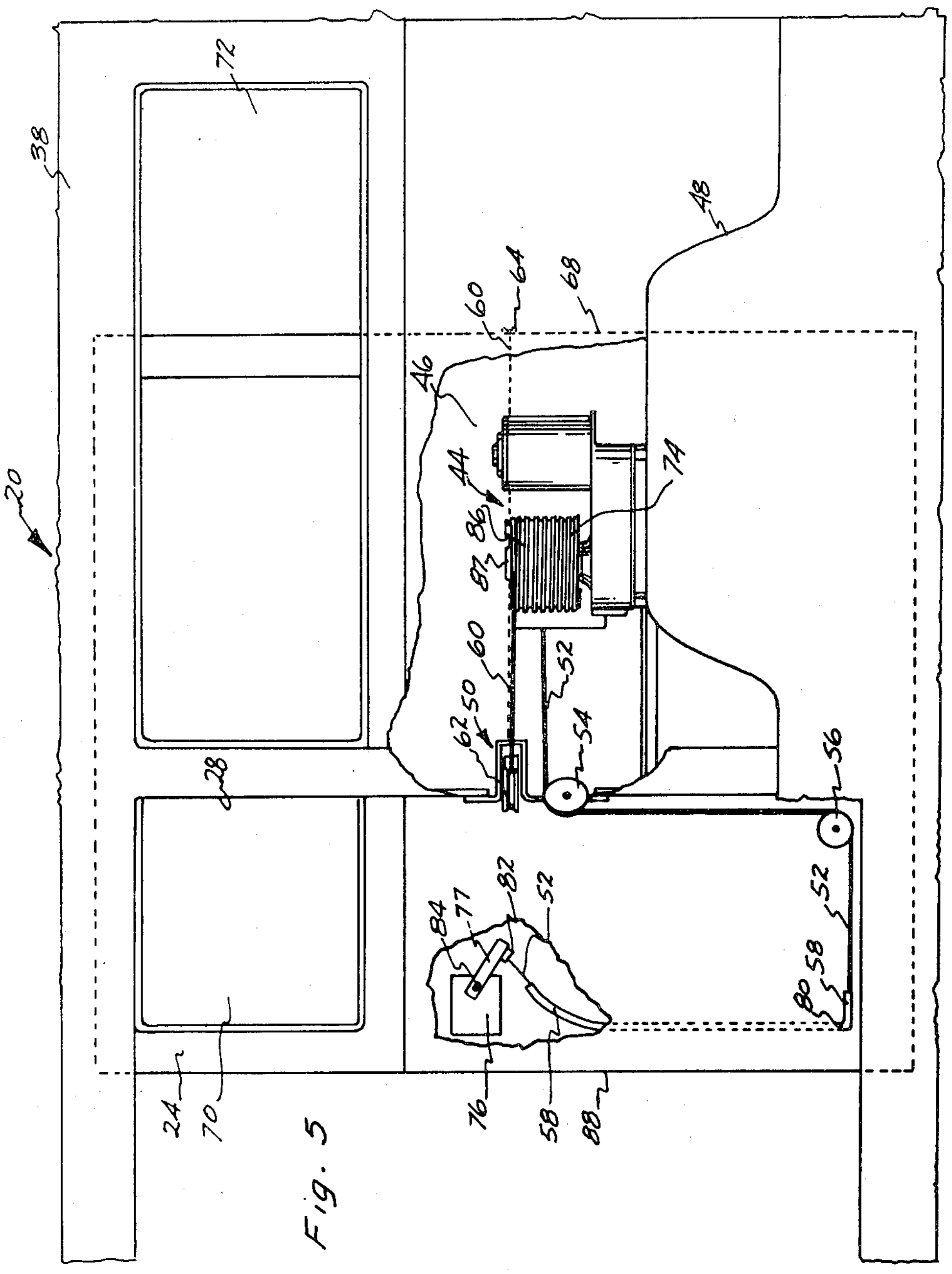
FIG. 5 is a fragmentary side-elevational view of a conventional van including an actuating mechanism in accordance with the invention, showing the door in an intermediate position.

FIG. 5 is a somewhat schematic view, shown from the inside of the van 20, showing one possible installation of the apparatus according to the invention, with door 24 in an intermediate position, between opened and closed positions. As illustrated, door 24 is provided with window 70 and vehicle side 38 is provided with a window 72. As shown in FIG. 5, opening cable 52 extends horizontally from helically-threaded winding drum 74, over pulley 54 downward to pulley 56, and towards the front of door 24 where it enters guide tube 58. Guide tube 58 guides cable 52 to the vicinity of arm 77, attached to conventional latch mechanism 76.

Guide tube 58 may be made in any shape, and further supported in any convenient manner within door 24, if desired. The preferred embodiment of guide tube 58 includes a bend 78 and a bend 80, guiding cable 52 into door 24, and upwards within door 24. In a conventional van, tube 58 may be adequately supported by the internal structure, omitted for clarity, of door 24, or conventional brackets may be placed at appropriate points. Also, bend 78 or 80 may be replaced by a pulley, if desired.

Arm 77 includes a bracket 82, having a slot or aperture to receive cable 52 fited with a conventional termination, not shown, crimped in place. Arm 77 also includes fitting 84. In the preferred embodiment, fitting 84 is a square bar attached to arm 77, and inserted into a mating opening, not shown, in conventional latching mechanism 76, to replace the exterior operating handle of door 24. Fitting 84 may also be a square aperture, or the like, fitting over the shaft of an operating handle of door 24, leaving all manual operating handles in original position.

Latch mechanism 76 connects to conventional latching devices provided on door 24 and door jambs 26 and 28 by appropriate rods and levers, not shown, which are left in place when an actuator, according to the invention, is installed. Also shown in FIG. 5 is the routing of closing cable 60 in a preferred embodiment of the invention, from a winding drum 86, over pivoted guide 62 which guides cable 60 around the edge of the door frame, to cable termination 64 on door edge 68.

FIG. 5 also illustrates a significant advantage of the disclosed preferred embodiments of the invention. To install the disclosed actuator, the trim panels are removed from the interior of the door of the van, and from the rear quarter-panel section of the van. A single square aperture is required to mount guide assembly 50 in door jamb 28. Drilling of several holes is required, such as to mount winch assembly 44 to wheel well 48, to mount pulley 56 at the lower rear corner of the door opening adjacent jamb 28, and to clamp guide tube 58 to bracket 30 in any convenient manner, after guide tube 58 is placed inside door 24. Arm 77 is preferably a replacement for the existing exterior door handle of the van, since the preferred way of opening door 24 from the outside of van 20 utilizes a key-operated switch adjacent jamb 26. In this case, the outer handle would be removed, the remaining opening plugged in conventional manner, and arm 77 provided with a fitting 84, fitting into latch mechanism 76 in place of the exterior handle. It is also necessary to mount cable termination 64 on rear edge 68 of door 24, and to mount the electrical control relays, to be described later, and the actuating switches, in some convenient locations in van 20. Cables 52 and 60 are preferably made of galvanized steel wire rope, and provided with ball-shaped ends, crimped in place, which are retained in appropriately-shaped slots in arm 77, drums 74 and 86, and termination 64. Drums 74 and 86 are rotatably mounted to shaft 87, as will be described below.

Figure 6:
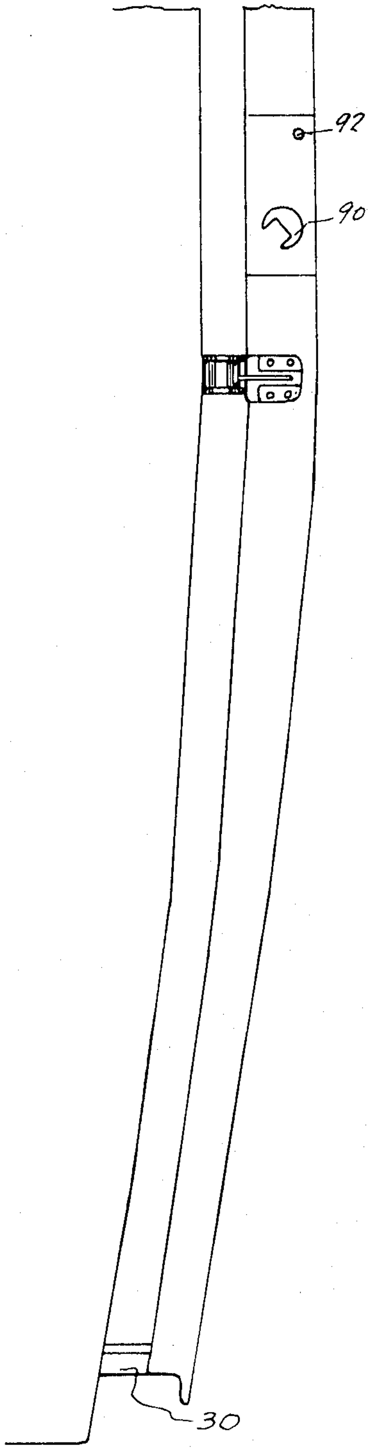
FIG. 6 is a fragmentary side-elevational view showing the rear edge of the door.
Figure 7:
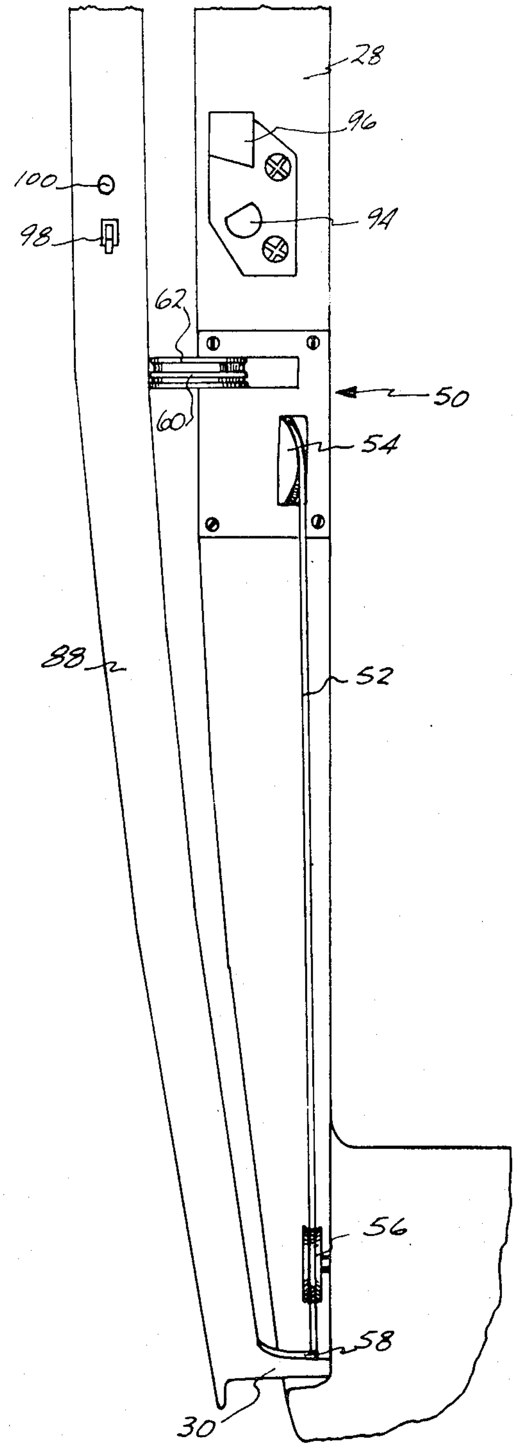
FIG. 7 is a side-elevational view showing the front edge of the door and rear edge of the door frame.

FIGS. 6 and 7 illustrate rear and front elevational views of door 24, showing edges 68 and 88, respectively. As shown in FIG. 6, the conventional latch mechanism in door 24 includes a pawl 90 and a guide pin 92. To latch door 24 using the conventional mechanism, door 24 is brought into alignment with the door frame manually, and the conventional operating handle is operated to cause rotation of pawl 90. This causes pawl 90 to engage a striker pin 94 provided on door jamb 28, and pull door 24 to latched position, with guide pin 92 engaging an appropriately-shaped guide 96. As shown in FIG. 7, front edge 88 of door 24 includes a latch pawl 98, engaging a striker, not shown, in door jamb 26, and a guide pin 100 engaging an aperture, not shown, in door jamb 26.

It will be appreciated from the description above that other, more complicated actuating mechanisms according to the invention can be provided to open and close a sliding door on a van, without manual effort. In a first alternate system, not illustrated, a single winching drum is operated by a DC motor, wired for dynamic braking, and a system of idler pulleys maintains tension in the operating cables. The winch drum is disengageably mounted to a driving shaft, so that the door may be moved manually in the event of power failure.

In a second alternate embodiment, not illustrated, separate motors are used for moving the door between open and closed positions and for laching and unlatching the door. Latching and unlatching may be performed by a motor, similar to an automotive windshield wiper motor, located in the door, and operating a pair of pull-rods to actuate the conventional latch mechanism.

A third alternate embodiment, not illustrated, utilizes a winch assembly driving a single loop of cable. The cable is provided with clips which engage a mechanism for latching and unlatching the door, and which engage the door, moving it between opened and closed positions. The mechanism for unlatching the door may include a mechanism for withdrawing the equivalent of striker pin 94 into door jamb 28. Latching door 24 may be accomplished by providing door 24 with a slot, and providing a jamb 28 with an arm engaging the slot, so that rotation of the arm draws door 24 inward.

Figure 8:
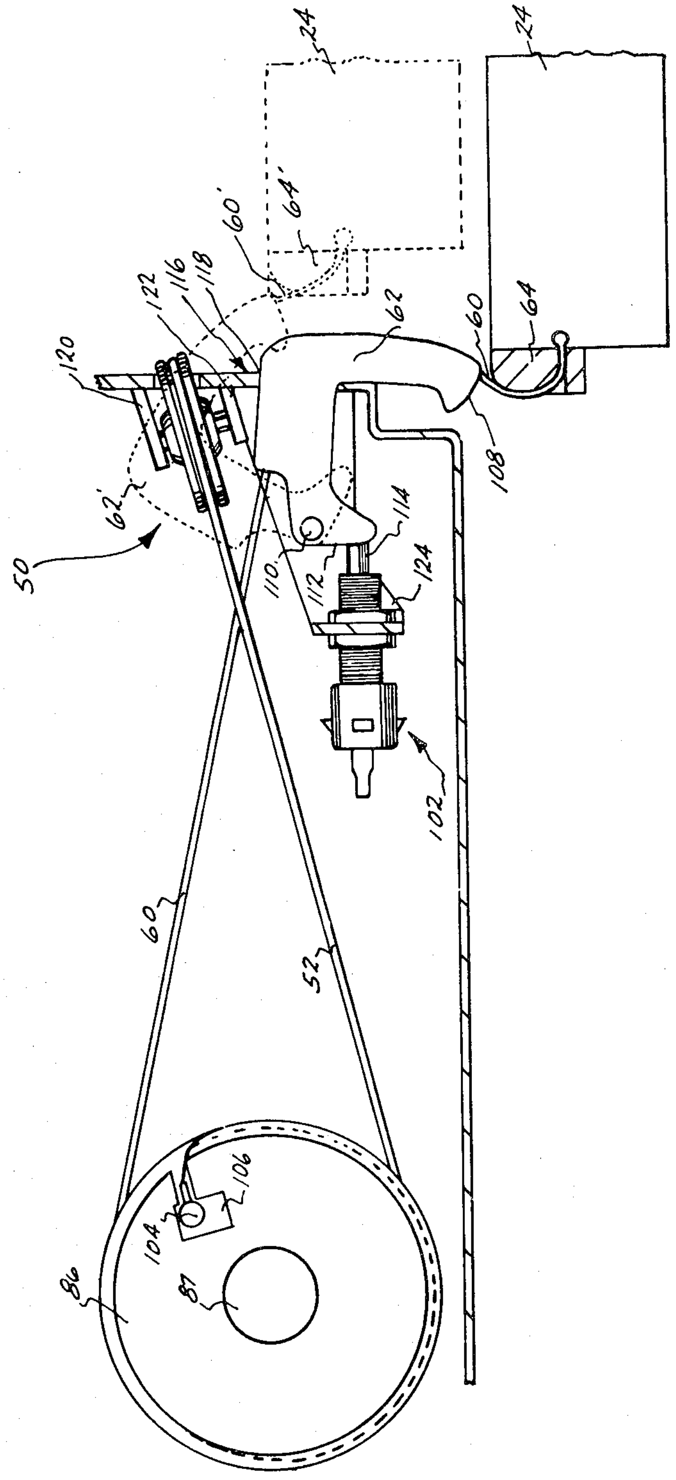
FIG. 8 is a top-elevational view of a guide assembly in accordance with the invention.

FIG 8 shows, somewhat schematically, the operation of pivoting guide 62, if such a pivoting guide is used, as door 24 is moved to or from latched position. As will be described below, switch 102 of guide assembly 50 cooperates with an additional field winding of an electric motor to provide additional force for latching the door, so that a lower, safer force can be used to slide the door towards its closed position. It will be apparent that guide 62 is preferred but not absolutely necessary for a functional embodiment of a van door actuator, and that there are other equivalent methods of guiding cable around a door frame, and of energizing an electric motor. In several actual embodiments of the invention, not shown, a fixed guide member is used, and a switch for detecting that the door is nearly closed. As shown, cable 60 is connected to drum 86, rotatably mounted on shaft 87, with cable end 104 fitting into T-slot 106 in drum 86. When drum 86, as illustrated, rotates in the counterclockwise direction, cable 60 is wound onto drum 86. As cable 60 is retracted, door 24 moves towards its closed position. In the view illustrated, this would be a rightward direction. Note that whenever directions are mentioned in connection with a description of the drawings, they are intended as explanations, not limitations. As door 24 nears its closed position, cable termination 64 moves adjacent to tip 108 of guide 62. In this position, as illustrated in solid lines, cable 60 is exerting a force substantially perpendicular to the plane of door 24, pulling door 24 towards latched position. As door 24 is pulled inward, cable termination 64 contacts tip 108 of pivoting guide 62, causing guide 62 to begin to move around its pivot 110. This causes portion 112 to move to the right, releasing switch plunger 114, causing contacts in normally-closed switch 102 to close, and causing the electric motor to provide a greater force. As door 24 continues to move inward, toward latched position, guide 62 will continue to pivot, to the position illustrated in broken lines and identified as 62'. If a pivoting guide member is not used, plunger 114 and switch 102 may be placed extending through bracket 116.

Also shown in FIG. 8 is a partial view of guide assembly bracket 116. Bracket 116 includes a mounting surface 118 for attachment to doorjamb 28, arms 120 and 122 protruding from surface 118 to support pulley 54, and a bracket 124 to support switch 102 and pivot 110 of pivoting guide 62.

Figure 9:
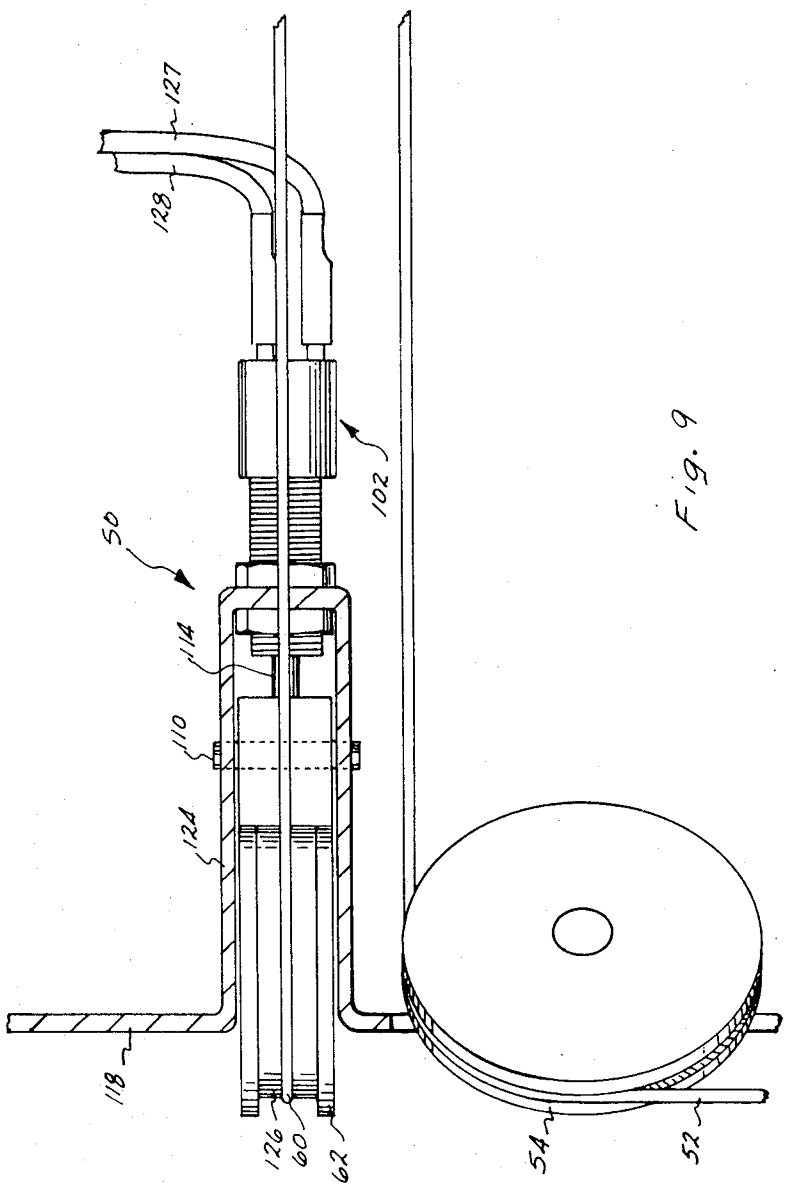
FIG. 9 is a fragmentary side-elevational view of a guide assembly according to the invention.

FIG. 9 is a fragmentary sectional view of guide assembly 50, as viewed from the interior of van 20. Cable 60 is shown disposed in cable groove 126 of guide 62. Also shown in FIG. 9 are wires 127, **127*a* and 128 connected to switch 102, leading to the control circuit shown in FIG. 17. A switch such as switch 102 may also be installed at any other convenient point around the periphery of the door frame, such as on jamb 26**.

Figure 10:
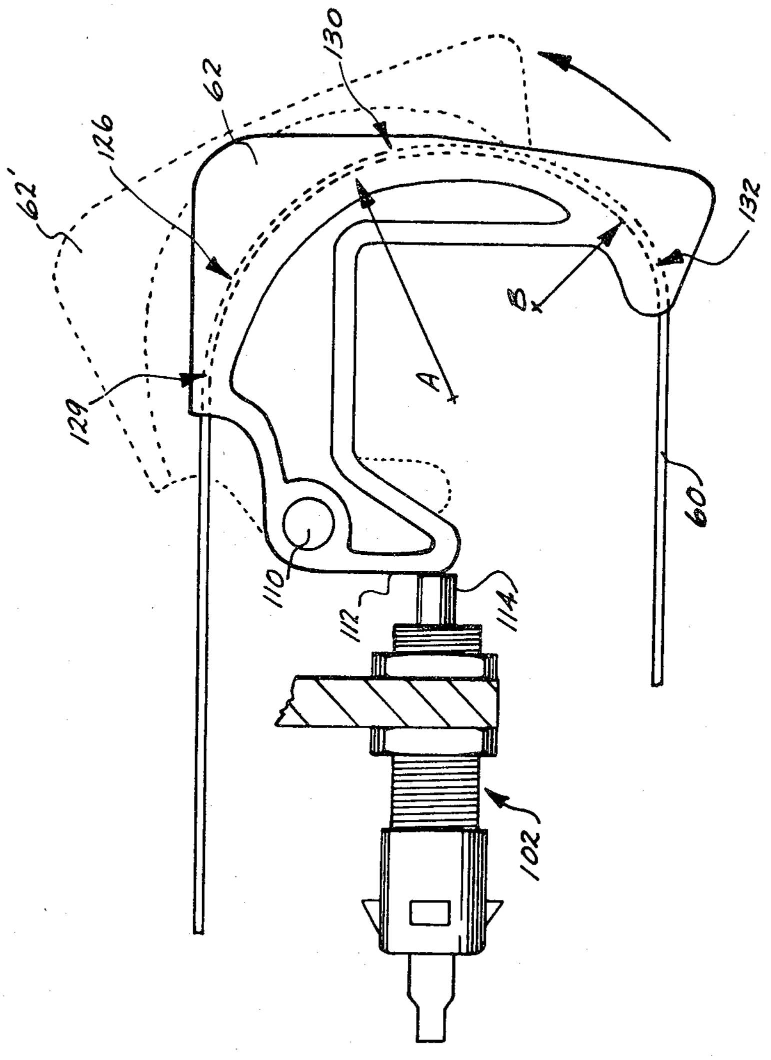
FIG. 10 is a top-elevational view of a pivotable guide according to the invention.

FIG. 10 is a detail view of pivoting guide 62, to explain the mechanism whereby the preferred embodiment of pivoting guide 62 moves to an operative or active position in guide cable 60 around the edge of the door frame as door 24 begins to open, and stays in that position when door 24 is moving towards its closed position. As shown in FIGS. 8 and 10, cable 60 is connected both to the rear edge of door 24 and to drum 86, so that there will always be substantially equal tension in the portions of cable 60 extending between drum 86 and guide 62, and between guide 62 and termination 64 on door 24. Of course, when door 24 is moving, there will be a small difference in tension in these two sections due to frictional force of cable 60 in cable groove 126. As shown in FIGS. 8 and 10, the portion of cable 60 connected to drum 86 passes significantly closer to pivot 110 of guide 62 then does the portion of cable 60 connected to termination 64. The tension in that portion of cable 60 connected to termination 64 exerts a greater moment about pivot 110 then does tension in that portion of cable 60 connected to drum 86. The movement of cable 60 in groove 129 creates frictional forces acting parallel to the surface of groove 129, in a direction dependent on the direction of movement of cable 60. These frictional forces also act as a moment around pivot 110.

Referring now to FIG. 10, groove 126 of guide 62 has a first surface 129, directing cable 60 to the drum 86, a surface 132 directing cable 60 to termination 64 and an intermediate surface 130. As the door 24 begins to open, the moment exerted by that portion of cable 60 tangent to surface 132 exceeds the moment exerted by that portion of cable 60 tangent surface 129, causing guide 62 to move to its operative position, aided by frictional forces of cable 60 sliding in groove 126. As will be apparent from FIG. 8, guide 62 moves to operative position as rapidly as allowed by termination 64 on door 24. Since the rear edge of door 24 springs outward when door 24 is unlatched due to seal compression, and the spring-loaded pivotally-mounted arm, not shown, guide 62 moves to operating position abruptly, in a stepwise fashion. However, proportions of guide 62 are such that the moment about pivot 110 caused by the tension in that portion of cable 60 tangent surface 132 exceeds the other moments, and retains guide 62 in operative position until it is physically pushed from operative position by termination 64. Note that the preferred embodiment of guide 62 includes a groove 126, formed with differing radii A and B to allow smooth transition of cable 60 to and from guide 62, in a minimum amount of space.

Figure 11:
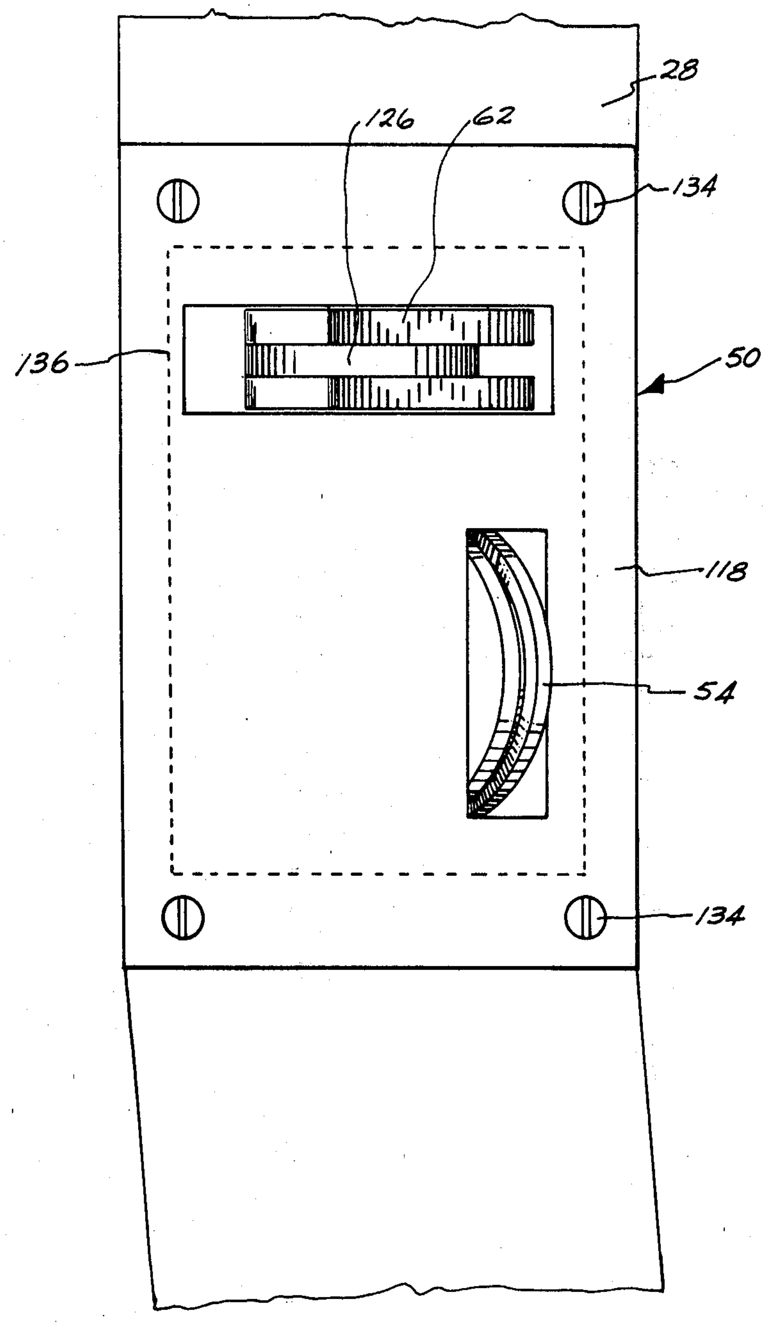
FIG. 11 is a front-elevational view of a guide assembly in accordance with the invention.

FIG. 11 illustrates guide assembly 50 mounted on doorjamb 28. Pivoted guide 62 is shown in inactive or inoperable position. As shown, mounting surface 118 is mounted to doorjamb 28 with four screws 134 over a generally-rectangular aperture 136 made in door jamb 28.

Figure 12:
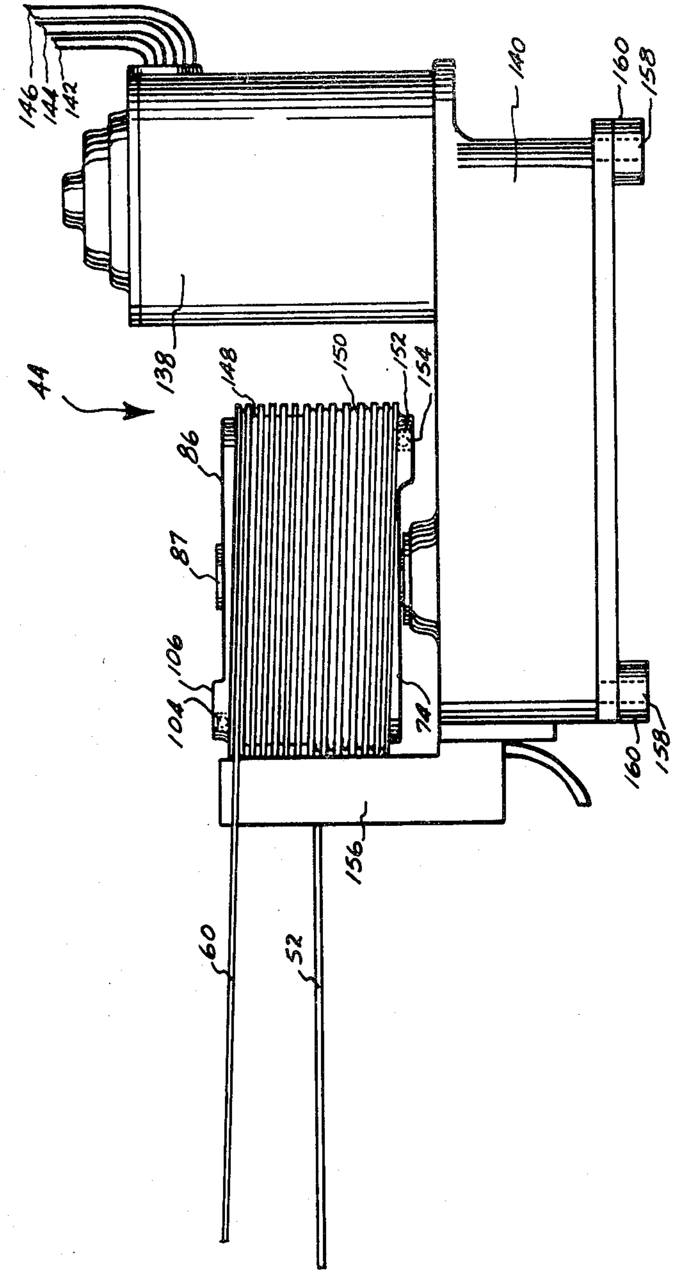
FIG. 12 is a side-elevational view of a winch assembly in accordance with the invention.

FIG. 12 shows a winch assembly according to the invention. An electric motor 138 is mounted to gear box 140. As will be described later, the direction of rotation and torque output of motor 138 are controlled by applying electrical power through wires 142, 144 and 146. Gear box 140 has output shaft 87, and contains appropriate gearing so that output shaft 87 may rotate motor 138 without requiring excessive force so that door 24 may be opened and closed manually in the event that there is a loss of electrical power, but requiring sufficient force to hold the door 24 in position when van 20 is on a grade, and so that motor 138 may drive shaft 87 at an appropriate speed for opening and closing the door 24. Gear box 140, in the preferred embodiment, is designed with otherwise unnecessary metal gears, since this type of gear is relatively noisy, and provides an audible indication of operation. Lacking this, a conventional pulsed sound generator or flashing light should be used.

Drums 74 and 86 are rotatably mounted to shaft 87. Drum 86, in the preferred embodiment, includes a single-entry helical groove 148, adapted to carry cable 60, and a T-slot, not shown, to retain an end of cable 60. Drum 74, in the preferred embodiment, includes a single entry helical groove 150 adapted to receive cable 52, and a T-slot 152 adapted to retain an end 154 of cable 52. Obviously, drums 74 and 86 need not be grooves. Winch assembly 44 also may include door-open switch housing 156, which contains a switch mechanism for indicating that door 24 has reached its fully opened position. In most physical embodiments of the invention, no door-open switch is provided, since the operator may easily determine when the door 24 is open. This switch is illustrated in detail in FIG. 16. Winch assembly 44 is mounted to van 20 by bolts or the like passing through holes 158 in mounting pads 160. This also provides a ground path for motor 138.

Figure 13:
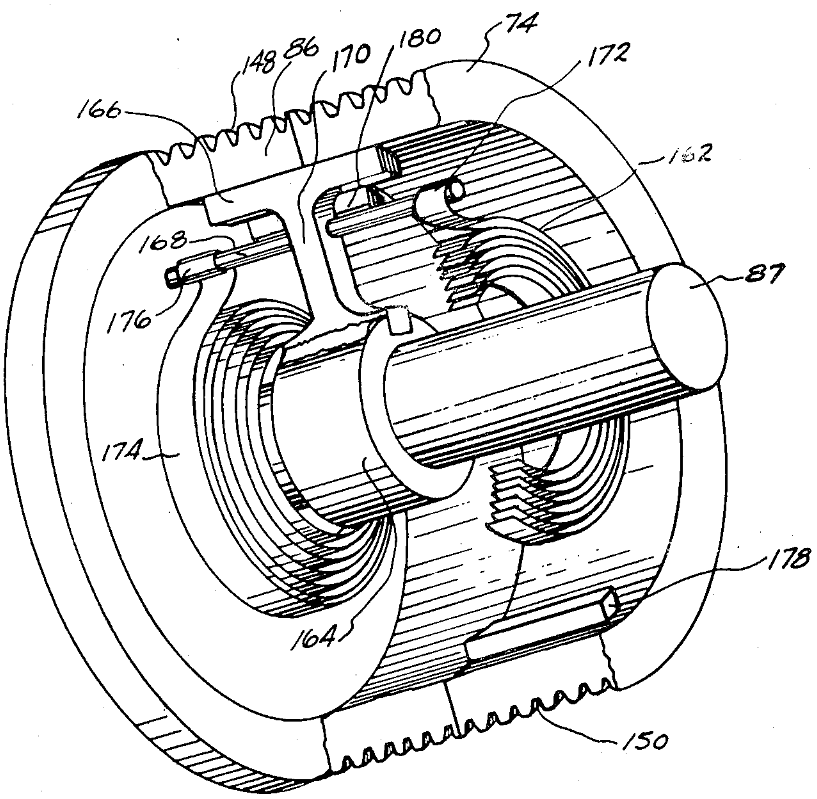
FIG. 13 is a perspective view, partially in section, of a winch drum in accordance with the invention.

FIG. 13 illustrates, in perspective, a winching drum according to the invention, for compensating for differential extension between cables 52 and 60, and for maintaining tension in cables 52 and 60. Winching drums 74 and 86 are rotatably mounted on a common shaft 87. Drum 74 is resiliently connected to shaft 87 through spring 162. In the embodiment illustrated, shaft 87 includes a fixed collar 164, to which a T-shaped engaging means or driver 166 is welded so that driver 166 protrudes radially from collar 164. A pin 168 passes through the upright portion 170 of T-shaped driver 166. Curled end 172 of spring 162 is retained by pin 168. The opposite end of spring 162 is bent at a right angle, and is retained by a groove in a hub of drum 74. Spring 174 is connected between shaft 87 and drum 86 in a similar manner, with a curled end 176 retained by pin 168, and an opposite end bent at a right angle and inserted in a slot in a hub of drum 86. The retention of springs 162 and 174 is detailed in FIGS. 14 and 15.

It is important to note that springs 162 and 174 must be wound in opposite directions. Rotation of shaft 87 in a first direction must increase the tension in spring 162, thereby storing energy in spring 162, so that spring 162 may at a later time force drum 74 further in the first direction, with shaft 87 stationary. Rotation of shaft 87 in the first direction must also tend to unwind spring 174. Rotation of shaft 87 in a second direction must tend to unwind spring 162, and wind spring 174, storing energy in spring 174 so that spring 174 may at a later time, cause drum 86 to rotate in the second direction, with shaft 87 at rest.

As shaft 87 rotates in the first direction, energy will be stored in spring 162 until driver 166 contacts a stop 178 provided on the interior surface of drum 74. Continued rotation of shaft 87 in the first direction will then drive drum 74 firmly in the first direction. Drum 86 is provided with a stop 180, which also cooperates with driver 166. When shaft 87 is rotated in the second direction, energy is stored in spring 174 until driver 166 contacts stop 180. Continued rotation of shaft 87 in the second direction will firmly drive drum 86 in the second direction.

With the actuating system according to the invention mounted in the van, as shown in FIG. 1–7, rotation of shaft 87 in the first direction will cause drum 74 to resiliently take up cable 52, which is connected to door latch mechanism 76. Resilient tension on cable 52 operates latch 76, releasing the door. As shaft 87 continues to turn, driver 166 contacts stop 178, providing a firm, nonresilient force to move door 24 towards the opened position. Should rotation of shaft 87 cease, when door 24 has reached its fully opened position, or in some intermediate position, spring 162 will resiliently force drum 74 to continue to draw in cable 52, thereby maintaining tension in cable 52.

In closing door 24 from its opened position, shaft 87 is rotated in the second direction, storing energy in spring until driver 166 contacts stop 180, applying a firm, nonresilient force to cable 60 to pull the door towards its closed position. When rotation of shaft 87 ceases, spring 162 will cause drum 87 to resiliently draw in cable 60, maintaining tension on cable 60.

It should be noted, particularly in FIGS. 1–4, that front edge 88 and rear edge 68 of door 24 describe different paths, and move different distances, particularly when door 24 is latched or unlatched, and rear edge 68 moves in the second direction, while front edge 88 is substantially stationary in the second direction. In other words, the motion of door 24 is composed motion, both translation and rotation. A means shown as springs 162 and 174 interposed between shaft 87 and drums 74 and 86 compensate for the differential displacement travel of cables 52 and 60, while maintaining tension on cables 52 and 60.

Figure 15:
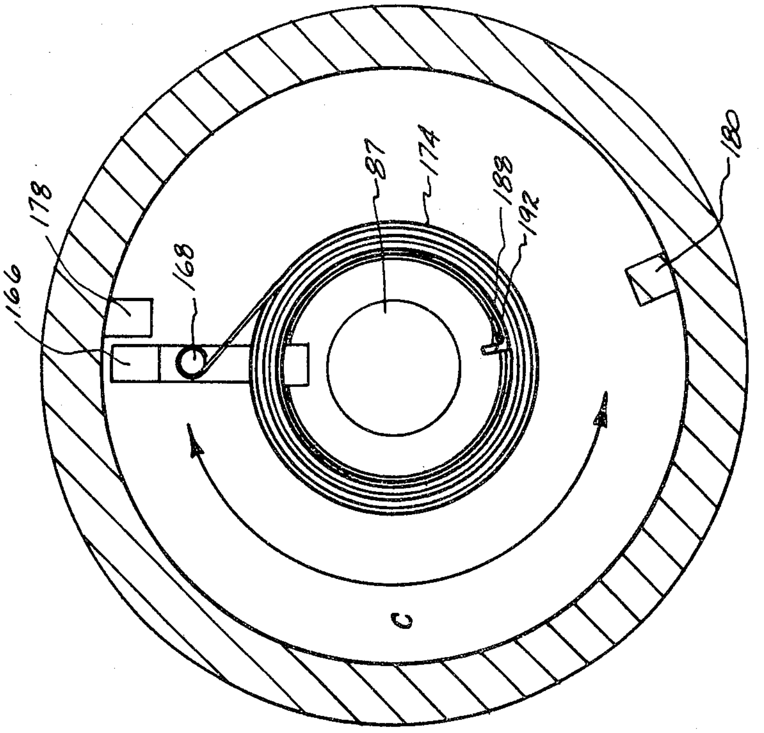
FIG. 15 is a top-elevational view of a winch drum according to the invention, taken along line 15—15 in FIG. 14.
Figure 14:
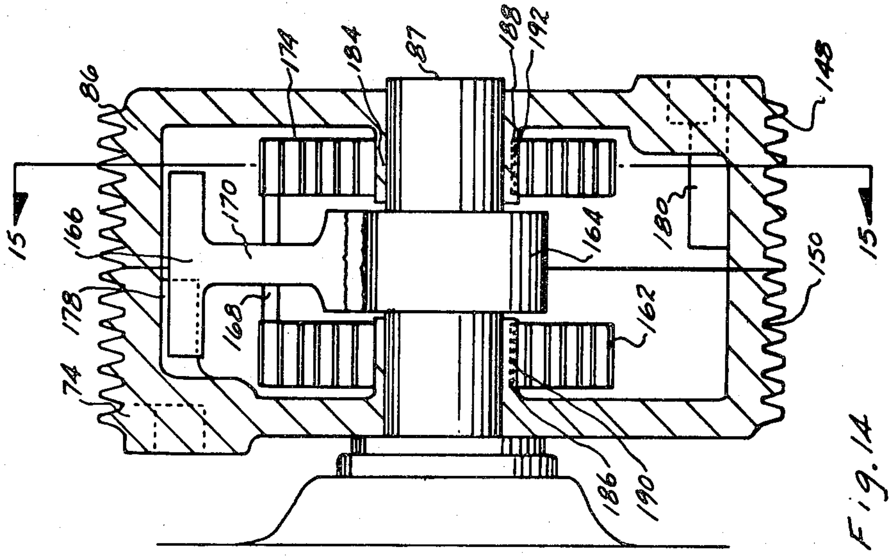
FIG. 14 is a side-elevational view, partially in section, of a winch drum according to the invention.

FIGS. 14 and 15 further illustrate the structure of winding drums according to the invention. Drum 74 includes a hub 182, and drum 86 includes a hub 184. Hubs 182 and 184 are provided with slots 186 and 188, respectively. Springs 162 and 174 have inner ends 190 and 192 which are bent at right angles, and retained in slots 186 and 188.

FIG. 15 is a view taken along line 15—15 in FIG. 14. Although driver 166 is shown immediately adjacent stop 178, the actual position of driver 166 with respect to stop 178 and 180 will depend on the energy stored in springs 162 and 174 at a particular point during the travel of door 24. In other words, driver 166 will be disposed on an arc C between stop 178 and stop 180, although its exact position along arc C varies as the door moves from latched position to fully opened posstion and returns, particularly when movement is interrupted. In the preferred embodiment, with the actuating system according to the system installed in van 20, with the door 24 in latched position, an arc C of approximately 90° separates stops 178 and 180, so that the rotation of shaft 87 may store substantial energy in spring 162 before driver 166 contacts stop 178, imparting a positive force to cable 52 to open door 24. In this manner, drums 74 and 86 automatically adjust for differential extension between cable 52 and 60, due to compound rotational and translational motion of door 24, and maintain tension in cables 52 and 60, without requiring any external compensating or tensioning elements adding to cost of the actuating system and the difficulty of its installation, service and repair.

Figure 16:
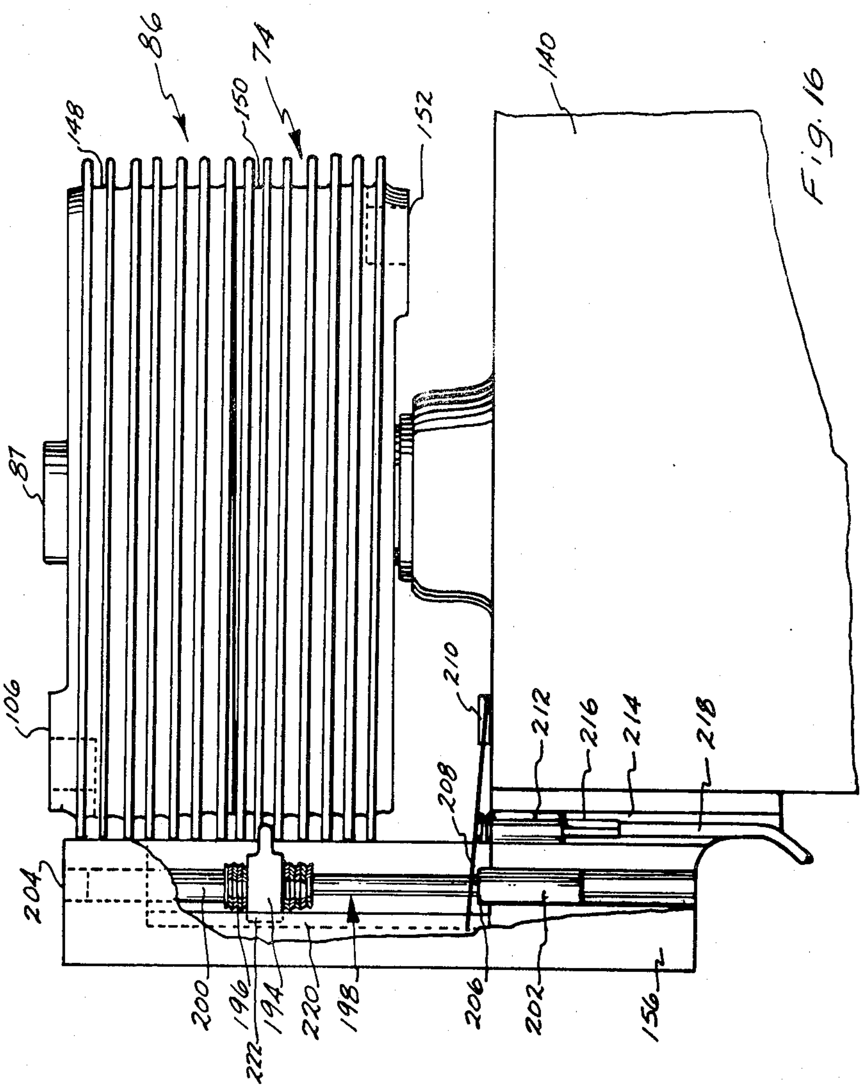
FIG. 16 is a fragmentary side-elevational view, partially in section, of a winch assembly according to the invention, showing the construction of a switch which causes opening motion of the door to cease when the door reaches its fully open position.

FIG. 16 illustrates the construction and operation of a switch construction which may be used to indicate when door 24 is in its fully opened position, and prevents further actuation in the opening direction. Alternatively, a conventional switch may be mounted in any convenient position to detect that the door 24 is open, or, in several physical embodiments of the invention, no door-open switch is provided. For clarity, cables 52 and 60 are not shown, although from the above it is apparent that when door 24 is in fully opened position, drum 86 is substantially empty, and cable 52 substantially fills helical groove 150 in drum 74. However, in the illustrated embodiment, as illustrated, follower 194 engages a portion of helical groove 150 that is not occupied by a portion of cable 52, follower 194 always being above the last turn of cable 52 on drum 74. Follower 124 has internal threads, not shown, to adjustably retain it to threaded section 196 of shaft 198. Shaft 198 has enlarged ends 200 and 202 which are slidably retained in bore 204. End 202 forms shoulder 206 which contacts switch leaf 208. Switch leaf 208 is retained to the exterior surface of gear box 140 by screw 210. Contact 212 is pressed into bore 214, adjacent bore 204, and between screw 210 and bore 204. Contact 212 has tubular end 216, into which wire 218 is crimped. Therefore, as cable 52 is wound onto drum 74, follower 194 and shoulder 206 will move upward, deflecting switch leaf 208 upward, until switch leaf 208 no longer touches contact 212.

In the illustrated embodiment, switch housing 156 has an internal groove 220, which cooperates with guide portion 222 of follower 194 to prevent follower 194 from rotating, and becoming disengaged from, or jamming in, groove 150. Groove 220 and portion 222 also facilitate the adjustment of the position of follower 194 upon shaft 198, by rotating shaft 198 so that follower 194 moves on threaded section 196 of shaft 198.

Figure 17:
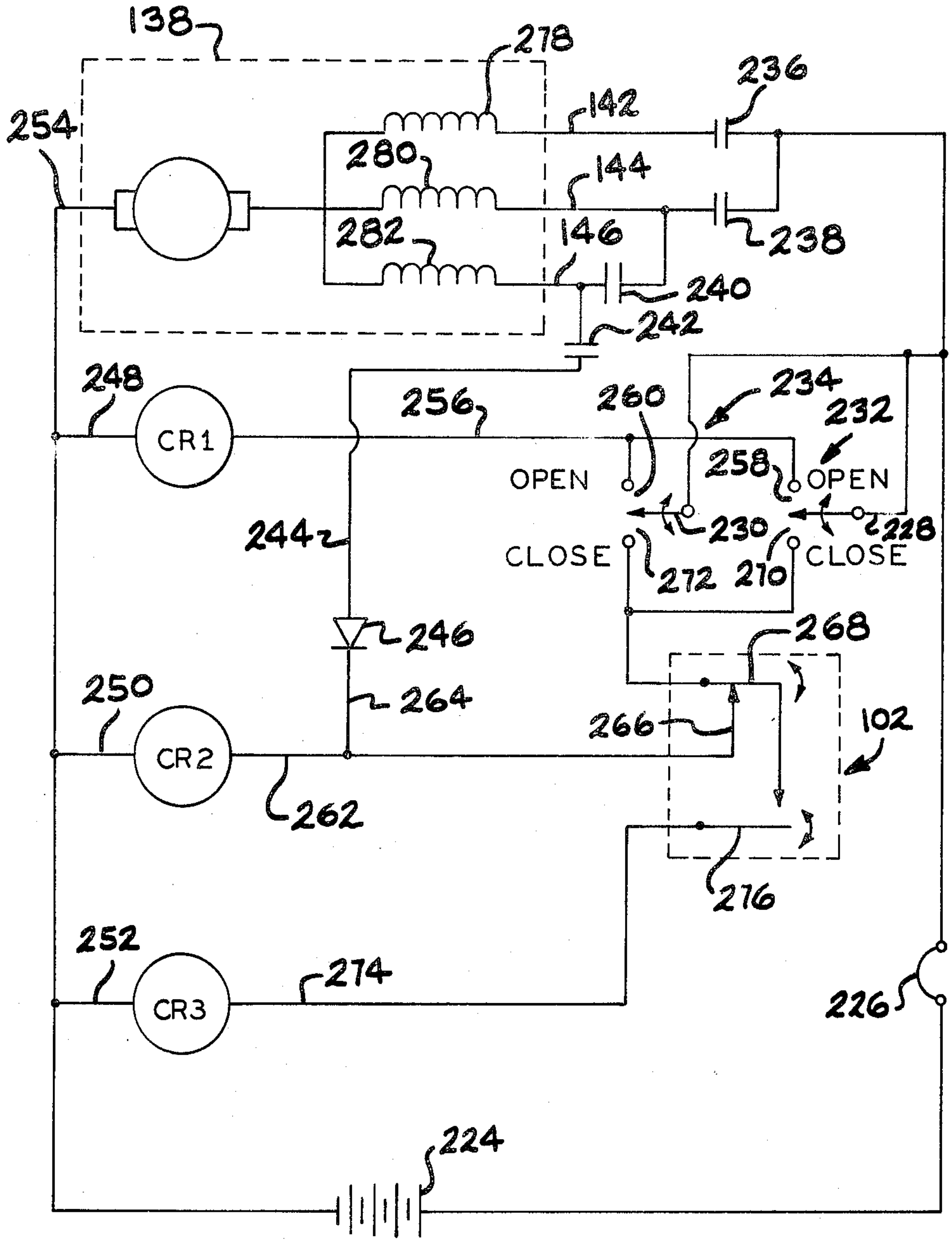
FIG. 17 is an electrical schematic of an improved control circuit for operating the actuating mechanism in accordance with the invention.

FIG. 17 is a circuit diagram of the preferred functional embodiment of a control circuit for a van door actuator according to the invention. The circuit illustrated includes a vehicle battery or the like power source for an electric motor, and appropriate switches and control relays.

As illustrated, the first or positive terminal of vehicle battery 224 is connected through circuit breaker 226 to wipers 228 and 230 of switches 232 and 234, and also to contact sets 236 and 238 of control relays CR1 and CR2. One of switches 232 and 234 is preferably disposed on the dashboard of a vehicle, and the other on the exterior of a vehicle, adjacent door 24. Contact sets 236 and 238 are normally open contacts interposed between circuit breaker 226 and wires 142 and 144 of motor 138. Contact set 238 is also interposed between circuit breaker 226 and a first contact set 240 of control relay CR3. First contact set 240, a normally open contact set, interconnects wires 144 and 146. A second contact set 242 of control relay CR3 is interposed between wire 146 and the anode 244 of a diode 246. The second or negative terminal of battery 224 is connected to leads 248, 250 and 252 of control relays CR1, CR2 and CR3 respectively, and also to ground or return lead 254 of motor 138. The body of chassis of a van may serve as ground lead 254.

A second lead 256 of control relay CR1 is connected to first stationary contact 258 of switch 232 and first stationary contact 260 of switch 234. Second lead 262 of control relay CR2 is connected to cathode 264 of diode 246 and to fixed contact 266 of switch 102, the shown as a make-before-break switch. Normally-closed movable contact 268 of switch 102 is connected to second stationary contact 270 of switch 232 and to second stationary contact 272 of switch 234. A second lead 274 of control relay CR3 is connected to normally-open movable contact 276 of switch 102. Control relay CR1 operates contacts 236, energizing first winding 278 to open door 24, control relay CR2 operates contacts 238 to energize second winding 280 to move door 24 towards closed position, and control relay CR3 operates contacts 240 and 242, contacts 240 energizing third winding 282 to latch door 24.

To unlatch and open door 24, wiper 228 of switch 232 or wiper 230 of switch 234 is moved into contact with stationary contact 258 or 260, respectively, current from battery 224 flowing through circuit breaker 226 and the closed contact to energize control relay CR1. Control relay CR1 causes contacts 236 to close, applying power to winding 278 and causing motor 138 to rotate in an appropriate direction to close door 24. To close door 24, wiper 228 of switch 232 or wiper 230 of switch 234 is moved into contact with stationary contact 270 or 272, respectively, current then flowing through the closed contact between wiper 228 and contact 270 or wiper 230 and contact 272, through movable contact 268 and fixed contact 266 of switch 102, energizing control relay CR2, which operates contacts 238 to energize winding 280 and cause motor 138 to rotate in an appropriate direction to close door 24. As door 24 approaches its closed position, movable contact 276, operated by a plunger such as 114 will contact movable contact 268. Current will then flow from contact 270 or 272, through contact 268 and 276 to energize control relay CR3, which operates contacts 240 to energize winding 282, windings 280 and 282 now operating together to provide magnetic flux for motor 138 and increase its torque. Contacts 242, also operated by control relay CR3, at this time supply power from wire 146 through diode 246 to lead 262, thus preventing control relay CR2 from being de-energized before door 24 has completely closed. When door 24 reaches its closed position, further actuation of movable contact 276 against contact 268 will interrupt the electrical circuit between contacts 266 and 268, disabling one path for which current can flow through lead 262 to control relay CR2. At this time, the operator would normally release whichever of switches 232, 234 had been initially energized to close door 24. However, if one of these switches is maintained in operated position after door 24 is closed, circuit breaker 226 will operate to remove power from the circuit after approximately 12 seconds. If both switches 232, 234 are moved to de-energized position, and then one of them is subsequently operated to close door 24 when door 24 is in closed position, current will be supplied through contact 268 to contact 276 and lead 274 of control relay CR3, energizing control relay CR3. As can be seen, unless control relay CR2 is energized, no current will flow to winding 282, so that such switch operation energizes control relay CR3 without any effect. Control relay CR3 is chosen for continuous operation. Thus, the circuit of FIG. 17 allows the use of an exterior switch 232 or 234 for which a key must be used to open door 24, and for which no key is required to close and lock door 24, since operation of the switch towards the closing position by a passerby will have no effect on the door actuating mechanism of the invention.

Numerous modifications and variations of the disclosed embodiment of the invention may be easily made by one skilled in the art without departing from the spirit and scope of the invention.

I claim:

1. A control circuit for controlling an electric motor, having first, second and third windings, including:

a source of electrical power;

first relay means for operating first relay contact means;

second relay means for operating second relay contact means;

third relay means for operating third relay contact means;

first manual switch means sequentially operable to a first position, a second position and a de-energized position;

second switch means operable sequentially to make a first electrical circuit and then break a second electrical circuit and operable to sequentially break said first electrical circuit and then make said second electrical circuit;

said first manual switch being connected to said first relay means for energizing said relay means when said switch is operated to said first position;

said first manual switch means being further connected to said second switch means, said second electrical circuit of said second switch means being interposed between said first manual switch means and said second relay means, said second relay means being energized when said first manual switch is operated to said second position and said second electrical circuit is made through said second switch means;

said second switch means being also interposed between said first manual switch means and said third relay means;

said third relay means being energized when said first manual switch is operated to said second position and said first electrical circuit is made through said second switch means;

said first relay contact means being interposed between said source of electrical power and said first winding for energizing said first winding when said first relay contact means are closed;

said second relay contact means being interposed between said source of electrical power and said second winding for energizing said second winding when said second relay contact means are closed;

said third relay contact means being interposed between said second relay contact means and said third winding for energizing said third winding when said second relay contact means and said third relay contact means are closed;

said second winding and said third winding being maintained de-energized after said first manual switch means has been operated to said second position and is then operated to said de-energized position and then to said second position.

2. A control circuit according to claim 1, wherein:

said control circuit includes means for maintaining said third relay means in energized condition until said second electrical circuit has been broken after said first manual switch means has been operated to energize said second and third windings.

3. A control circuit according to claim 2, wherein:

said third relay means includes forth relay contact means;

said control circuit includes rectifying means;

said fourth relay contact means and said rectifying means being electrically connected in series between said third relay contact means and said second relay means;

said fourth relay contact means being said means for maintaining said third relay means in energized condition until said second electrical circuit has been broken after said first manual switch means has been operated to said second position to energize said second and third windings.

* * * * *